Figure 1:
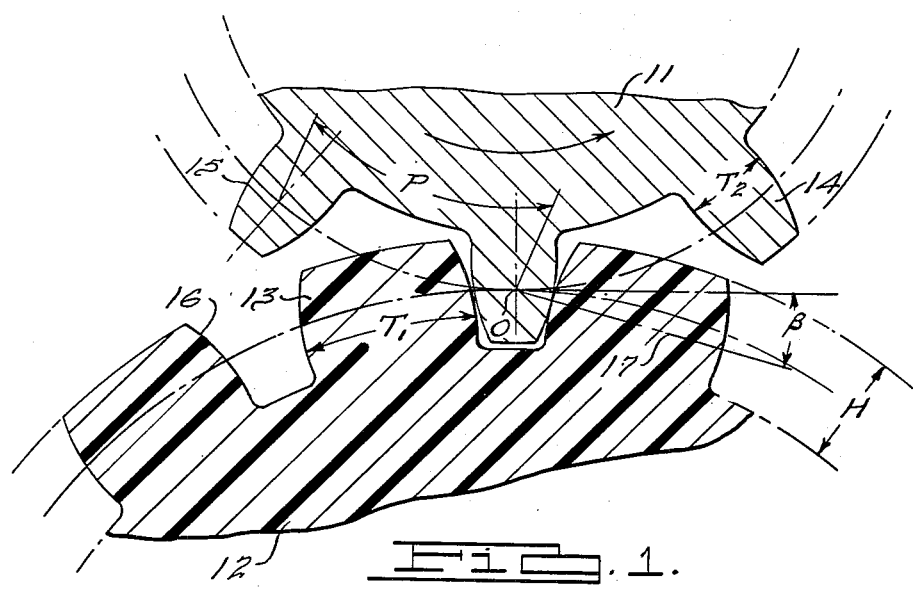

Aug. 28, 1956  J. PICKLES  2,760,381
CONSTRUCTION OF GEAR TEETH
Filed Oct. 22, 1952

INVENTOR.
Joseph Pickles.
BY
Harness, Dickey & Pierce
ATTORNEYS.

UNITED STATES PATENT OFFICE 2,760,381
Patented Aug. 28, 1956

2,760,381

CONSTRUCTION OF GEAR TEETH

Joseph Pickles, Dearborn, Mich., assignor to Hupp Corporation, Cleveland, Ohio, a corporation of Virginia Application October 22, 1952, Serial No. 316,156

3 Claims. (Cl. 74—458)

This invention relates to gearing, and more particularly to a novel construction for gear teeth in pairs having materials of different strengths.

As is well known, gear pairs are often and for various reasons manufactured of material having different strengths. The most common example is perhaps a driving pinion which is made of metal and a driven gear manufactured of a weaker substance such as a plastic. Designers of gear systems also often choose gears of moldable material for purposes of manufacturing economy. In many instances designers who are restricted, for these or other reasons, to the use of a particular material for one of the gears of a pair, find that, using the standard proportions prescribed for a particular conjugate form, the gear teeth will not have adequate strength to carry the required load. Increasing the pitch of the gear is of no advantage in this situation, since an increase in pitch does not substantially increase the beam strength of the individual teeth because of the longer bending arm which results.

The problem may be overcome by increasing the absolute diameters of the gear and pinion, thereby decreasing the load on the gear teeth, but in many instances this alternative is not possible because of space restrictions. Another alternative has been to increase the length of the tooth face, thus decreasing the unit stress, but this method also has several disadvantages. For example, if the face is very long compared to the pitch, or the thickness of the teeth, there is a likelihood that the pressure will not be uniformly distributed along the face. Moreover, when a worm and worm wheel is used, this alternative is impossible because the worm diameter determines the face length of the worm wheel teeth.

Both of these alternatives have a further disadvantage in that they waste considerable material, since the gear made of stronger material is much larger than necessary and is understressed. The latter disadvantage is present even if a third alternative is adopted, namely, the choice of a different gear system. The use of a gear system having a larger pressure angle, for example, to decrease the bending and shear stresses in the gear teeth will ordinarily result in the gear of stronger material being understressed and therefore wasting material. The use of larger pressure angles also has other disadvantages such as an increase in the separating forces between the gears which raises the bearing loads.

It is an object of the present invention to overcome the disadvantages of these previously used expedients and to provide a construction for gear pairs which will provide increased strength for the gear teeth of weaker material without wasting unnecessary material in the stronger gear.

It is another object to provide a novel construction for gear pairs in which the above objects will be achieved without changing the true conjugate action or reducing the arc of contact of the gear teeth. In this connection, it is an object to provide a construction in which the same pressure angle is maintained as with conventionally shaped teeth, but in which the bending and shear stresses are nevertheless substantially reduced.

It is a further object to provide a construction as above described, which is extremely versatile and flexible in application, which can be applied to spur, helical or worm gears, and which in a given application can utilize the same circular pitch as would ordinarily be used, thus maintaining the smoothness of action of conventionally designed gears.

It is another object to provide a construction as above described, which is especially adapted for use with gears made of plastic or similar material. In this connection, it is an object to provide a construction in which the gear teeth will have better curing stability when molded, will have better heat dissipation properties, thereby increasing the permissible operating loads, and which will maintain strength after substantial wearing.

Other objects, features, and advantages of the present invention will become apparent from the subsequent description, taken in conjunction with the accompanying drawings.

Figure 2:
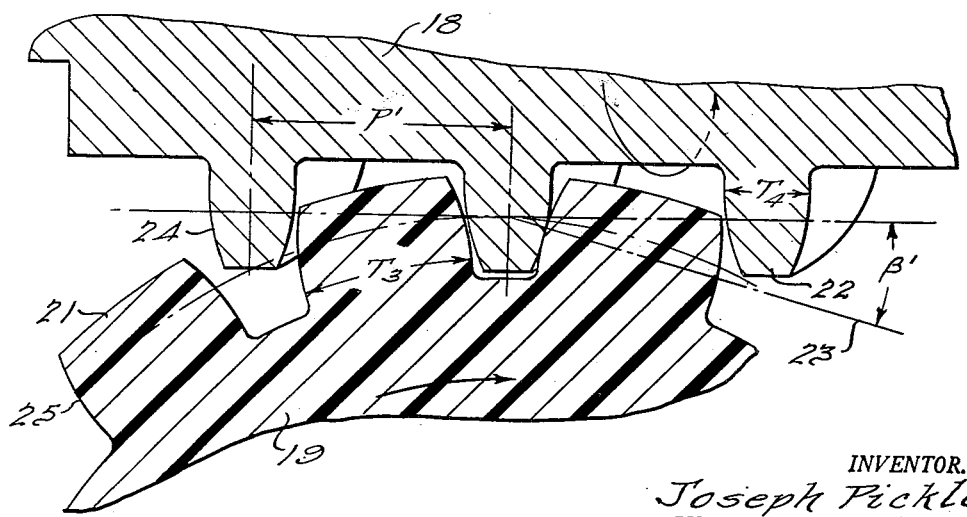

In the drawings:

Figure 1 is a representation of portions of a spur pinion and gear, showing the application of the invention thereto; and Figure 2 is a representation in cross-section of a portion of a worm and its mating worm wheel, showing a further application of the invention.

The invention consists essentially in making the tooth thickness of the gear of weaker material a substantial amount greater than one-half the circular pitch, and making the tooth thickness on the gear of stronger material substantially less than one-half the circular pitch, while retaining the conjugate surfaces for the chosen gear system. In practice, as is well known, standard proportions are prescribed for tooth thickness as well as for other tooth dimensions in any particular system of gear proportions, the primary purpose of these prescribed proportions being the interchangeability of gears of a given pitch. See for example the table in Maleev, Machine Design, first edition, page 461. In gear pairs manufactured according to the invention, the relative bending strengths of the two materials are examined, and the tooth thicknesses on the two gears are proportioned generally in accordance with their relative strengths, taking into account other factors such as manufacturing convenience. The tooth surfaces of both gears are still shaped so as to produce a true conjugate action.

Referring now more particularly to drawings, in Figure 1 a spur gear pair is illustrated comprising a driving pinion 11 and a driven gear 12. The driving pinion in this instance is formed of a metallic material while the gear is formed of a moldable plastic such as nylon. The circular pitch is referred to by the dimension P while the pressure angle is denoted by the angle $\beta$, passing through the pitch point O on the pitch circles. It may be assumed that the strength of the material of which the gear 11 is made is substantially greater than the strength of the material constituting gear 12. According to the invention, the thickness $T_1$ of each tooth 13 on gear 12 is substantially greater than one-half the circular pitch P. Likewise, the thickness $T_2$ of each tooth 14 on pinion 11 is made substantially less than one-half P, and in fact is chosen as approximately the difference $P-T_1$, less the desired backlash. The tooth faces 15 on gear 11 and 16 on gear 12 are formed according to their true conjugate shape, so that the pressure angle $\beta$ remains the same as if the gears were entirely constructed according to standard proportions. In the illustration, a standard 14½ degree involute gear system is shown, although it will be understood that the invention is equally applicable to other gear systems.

Due to the substantially increased thickness of gear teeth 13, both the beam strength and the shear strength of these teeth are markedly increased. The increase in beam strength will be obvious from an examination of the figure which shows that the ratio of thickness $T_1$ to height $H$ is substantially increased. It should be remembered at this point that if it were attempted to strengthen the teeth merely by increasing the circular pitch, the beam strength would not be substantially affected because the height of the teeth would increase along with their thickness, the ratio remaining about the same. The increase in shear strength of the teeth on gear 12 is apparent from examination of the line of action 17 passing through the pitch point O. It will be seen that the line of action passes through a substantial portion of the gear material. In fact, in some applications such as where there is a large difference in gear diameters, the line of action may pass into the body of the gear.

It is therefore apparent that the invention achieves the advantages of an increased pressure angle, namely, minimization of bending stresses and of shear stresses, while the disadvantages of a large pressure angle, such as increased sliding coefficients and bearing loads, are avoided. Moreover, since the absolute height $H$ of the teeth is not decreased, the advantages of teeth of proper height, such as running quietness and proper arc of action, are retained. As for pinion 11, the teeth 14 thereof are still of sufficient thickness to accommodate the expected tooth loads, but the pinion does not have excess or waste material, and the teeth are not understressed.

The construction described above has other advantages which makes the invention especially applicable to gears formed of plastic materials. Since the sections of the gear teeth 13 are substantially heavier than those having standard proportions, the teeth of molded gears will have greatly increased curing stability. Moreover, since the heavier section has greater heat dissipating properties, the operating loads can be increased without the deformation which might ordinarily result with some plastics at increased temperatures. The effect of tooth wear would also be lessened due to the increased tooth thickness.

Figure 2 illustrates a second embodiment in which the invention is shown as applied to a worm and worm wheel gear. In this case the worm 18 is shown as formed of metal and the worm wheel 19 of a weaker material such as plastic. As in the previous embodiment, the relative strengths of the materials and manufacturing convenience are taken into account to choose the relative proportions of the tooth thickness. As shown, the teeth 21 on worm wheel 19 have a thickness $T_3$ substantially greater than one-half the circular pitch $P_1$, while the thickness $T_4$ of the teeth 22 on worm 18 is chosen as substantially the difference $P'-T_3$. Pressure angle $\beta'$ remains the same as with teeth of standard proportions, and the line of action 23 passes through a substantial portion of the worm gear material. Tooth faces 24 and 25 of the gears 18 and 19 respectively retain their standard conjugate form, the teeth thus cooperating with true conjugate action.

It should be emphasized that in most gear pairs to which the invention is applied, the gears retains their true conjugate action and their operation is in no way affected by the changed thickness proportions. This is because of the fact that if the circular pitch is the same as if the teeth were of standard proportions, the tooth faces retain their standard conjugate shape, and the existing center-to-center distances may remain the same. Thus, the gears will mesh with the same efficiency as if all standard tooth proportions were retained.

In some cases when applying the invention it may be desirable to utilize a smaller circular pitch than would ordinarily be used in order to maintain the smoothness of action. For example, this would be the case in spur gear drives where the pinion has the minimum number of teeth.

It is apparent that the invention is also applicable to types of gearing other than those illustrated, such as helical gears or a rack and pinion.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. A gear pair comprising two gears of given circular pitch and of a given gear system, one of said gears being of substantially weaker material than the other gear, the tooth thickness of each tooth of the gear of weaker material being substantially greater than one-half the circular pitch, the tooth thickness of each tooth of the other gear being substantially the difference between the circular pitch and the first tooth thickness, the tooth faces of both gears being of standard shapes for the given gear system.

2. A spur gear pair of a given circular pitch and a given gear system, one of said spur gears being of substantially weaker material than the other gear, the tooth thickness of each tooth of the gear of weaker material being substantially greater than one-half the circular pitch, the tooth thickness of each tooth of the other gear being substantially the difference between the circular pitch and the first tooth thickness, the tooth faces of both gears being of standard shapes for the given gear system.

3. A worm and worm wheel of given circular pitch and of a given gear system, said worm wheel being of substantially weaker material than said worm, the thread thickness of each tooth of said worm wheel being substantially greater than one-half the circular pitch, the thread thickness of each thread of said worm being substantially the difference between the circular pitch and the worm wheel tooth thickness, the tooth and thread faces of both gears being of standard shapes for the given gear system.

References Cited in the file of this patent

UNITED STATES PATENTS 2,399,925   Hewlett _____ May 7, 1946

OTHER REFERENCES

Publication: "Machine Design," October 1951, pp. 145–146.